United States Patent [19]

Mazgarov et al.

[11] Patent Number: 5,616,306
[45] Date of Patent: Apr. 1, 1997

[54] METHOD FOR REMOVAL OF HYDROGEN SULFIDE FROM GASES

[75] Inventors: Akhmet M. Mazgarov; Akhmatfail M. Fakhriev; Rais N. Khafizov; Leonid A. Kashevarov; Mikhail P. Alimov, all of Kazan, Russian Federation

[73] Assignee: Chevron U.S.A. Inc., San Francisco, Calif.

[21] Appl. No.: 460,369

[22] Filed: Jun. 2, 1995

Related U.S. Application Data

[63] Continuation-in-part of Ser. No. 313,637, Sep. 27, 1994, abandoned.

[51] Int. Cl.$^6$ ..................................................... C01B 17/16
[52] U.S. Cl. .................................................. 423/228
[58] Field of Search .................. 423/228, 573.1; 252/191, 192

[56] References Cited

U.S. PATENT DOCUMENTS

| | | |
|---|---|---|
| 3,068,065 | 12/1962 | Hartley et al. . |
| 4,009,251 | 2/1977 | Meuly . |
| 4,036,942 | 7/1977 | Sibeud et al. ........................ 423/573 |
| 4,091,073 | 5/1978 | Winkler . |
| 4,332,781 | 6/1982 | Lieder et al. . |
| 4,359,450 | 11/1982 | Blytas et al. . |
| 4,382,918 | 5/1983 | Diaz . |
| 4,388,293 | 6/1983 | Diaz . |
| 4,390,516 | 6/1983 | Blytas . |
| 4,400,368 | 8/1983 | Diaz . |
| 4,409,199 | 10/1983 | Blytas . |
| 4,515,764 | 5/1985 | Diaz ........................................ 423/573 |
| 4,518,576 | 5/1985 | Diaz . |
| 4,523,118 | 7/1985 | Tajiri et al. ............................ 423/226 |

FOREIGN PATENT DOCUMENTS

1287346A1  5/1995  Russian Federation .

*Primary Examiner*—Michael Lewis
*Assistant Examiner*—Amy M. Harding
*Attorney, Agent, or Firm*—R. J. Sheridan

[57] ABSTRACT

A process is provided for the removal of hydrogen sulfide from a hydrogen sulfide-containing gas by contacting said gas with an aqueous solution comprising chelated iron, an organic amine, an alkali metal hydroxide, carbonate or bicarbonate, and an alkali metal or ammonium phosphate or polyphosphate.

16 Claims, No Drawings

METHOD FOR REMOVAL OF HYDROGEN SULFIDE FROM GASES

CROSS REFERENCE TO RELATED APPLICATION

This application is a continuation-in-part of Ser. No. 08/313,637, filed Sep. 27, 1994 now abandoned.

BACKGROUND OF THE INVENTION

The present invention relates to processes of the absorptive treatment of gas for the removal of hydrogen sulfide, and may find application in the petroleum, gas, petroleum-processing and chemical fields of industry.

Absorbents are known which may be used to remove hydrogen sulfide from gas, the absorbent comprising an aqueous solution of a hydroxide of iron. The principal disadvantage of this absorbent is the relatively low rate of regeneration. Another composition used to remove hydrogen sulfide from gas is disclosed in U.S. Pat. No. 4,515,764, issued May 7, 1985 to Diaz. This composition contains a polyvalent metal (e.g., iron) chelate of nitrilotriacetic acid, phosphate and thiosulphate ions. Also, U.S. Pat. No. 4,532,118, issued Jul. 30, 1985 to Tajiri et al., discloses the removal of $H_2S$ from gas using a solution comprising ferric and ferrous ions, and ethylenediaminetetraacetic acid (EDTA) or a salt of EDTA, or triethanolamine (TEA) or a salt of TEA. Both of these U.S. patents are incorporated by reference herein in their entirety.

From the point of view of its technical essence and the result obtained, the absorbent suitable for the removal of hydrogen sulfide from gases which comes closest to the absorbent of the invention described herein comprises an aqueous solution of chelated iron, organic amine, and a hydroxide or carbonate of an alkali metal, in the following amounts, expressed as g/l:

| | |
|---|---|
| Chelated iron (as calculated for iron content) | 0.1–50 |
| Organic amine | 1–250 |
| Hydroxide of alkali metal | up to a Ph of 10 |
| Water | up to 1 liter |

U.S. Pat. No. 4,036,942, issued Jul. 19, 1977 to Sibeud et al, discloses a process for removing hydrogen sulfide and alkyl mercaptans from fluid streams by reaction with oxygen in the presence of a metal amino acid chelate in aqueous solution containing an amine, converting hydrogen sulfide to sulfur and alkyl mercaptans to dialkyl disulfides, and separating these from the aqueous metal chelate solution. The solution may also contain an amine such as lower, water soluble aliphatic, alicyclic or heterocyclic amines. Examples of such amines include triethanolamine.

The principal disadvantage of this absorbent consists of its high corrosive activity, up to 3 m/year, at 50° C.

SUMMARY OF THE INVENTION

The object of the invention consists of the lowering of the corrosive activity of the absorbent. Thus, in accordance with the present invention there is provided absorbent for the removal of hydrogen sulfide from gases, which includes an aqueous solution of chelated iron, organic amine, and a hydroxide or carbonate of an alkali metal, which additionally contains an alkali metal or ammonium phosphate, in the following quantities, expressed in terms of g/l:

| | |
|---|---|
| Chelated iron (as calculated for iron content) | 1–12 |
| Organic amine | 5–60 |
| Alkali metal hydroxide or carbonate | 0.1–60 |
| Alkali metal or ammonium phosphate (as calculated for phosphate-anion content) | 5–32 |
| Water | up to 1 l |

Compounds such as dimethylaminopropionitrile, triethanolamine, or dibutylamine may be used as the organic amine.

The absorbent in question possesses 10 times less corrosive activity, as compared to the known absorbent.

The present invention also provides a process for the removal of hydrogen sulfide from a hydrogen sulfide-containing gas comprising contacting said gas with an aqueous solution comprising chelated iron, an organic amine, an alkali metal hydroxide, carbonate or bicarbonate, and an alkali metal or ammonium phosphate or polyphosphate.

DETAILED DESCRIPTION OF PREFERRED EMBODIMENTS

A thorough investigation of absorbents based on chelates of iron containing organic amines demonstrated that the introduction of phosphates of alkali metals into the absorbent according to the ratio amine/anion of phosphate $\geq 1$ leads to a sharp decrease (by 10 times, or more) in the corrosive activity of the absorbent. In addition, along with the ratio indicated above being maintained, it is also necessary to maintain a ratio of the phosphate anion to the iron $>1$, whereas the amount of phosphate anion in the absorbent should not exceed 32 g/l, nor fall below 5 g/l.

The latter is conditioned by the fact that if the amount of phosphate anion exceeds 32 g/l, the stability of the absorbent is diminished (an insoluble residue is precipitated), whereas if the amount falls below 5 g/l, it becomes impossible to obtain the decrease in the corrosive effect of the absorbent.

The iron chelates useful in the practice of the present invention include, but are not limited to, chelates of iron and ethylenediaminetetraacetic acid.

The organic amines useful in this invention include, but are not limited to, dialkylaminopropionitriles, alkanolamines, and dialkylamines. Examples of these amines include dimethylaminopropionitrile, ethanolamines (such as triethanolamine), and dibutylamine.

Examples of the alkali metal hydroxides and carbonates include sodium and potassium hydroxides, and sodium and potassium carbonates and bicarbonates.

The phosphates which are useful in this invention include sodium, potassium and ammonium phosphates and polyphosphates.

EXAMPLE 1

The absorbent is prepared by dissolving the components in distilled water or in a vapor condensate. With the mixture being constantly stirred, 20 g of iron sulphate ($Fe_2(SO_4)_3 \cdot 9H_2O$) are dissolved in 800 ml of water, whereupon 50 g of a disodium salt of ethylenediaminetetraacetic acid (Trilon B) are added. This results in a yellowish-orange solution of the chelated iron with Trilon B. Then, as the stirring is being continued, 40 g of sodium phosphate ($Na_3PO_4 \cdot 12H_2O$) are added to the solution obtained above, followed by 25 g of dimethylaminopropionitrile (DMPN). After mixing, a 10% aqueous solution of sodium carbonate (common baking soda) is added by titration to the mixture obtained above, the pH of the solution being adjusted to fall within the limits of from 7 from 7 to 10. Then, the volume of the solution is raised to 1 l through the addition of water.

The prepared absorbent contains 4 g/l of iron in chelated form, 25 g/l of dimethylaminopropionitrile, 10 g/l of phosphate anion, the balance being soda and water. The pH of the absorbent is equal to 8.5. Using similar methods, it is possible to prepare absorbents having other compositions.

The rate of corrosion of steel in the absorbent was measured, at a temperature of 50° C., by gravimetric method using an autoclave unit. The overall duration of the experiment was 625 hours; of these, heating at 50° C. was conducted for a period of 145 hours. The remaining time, the samples remained in their respective compartments at a temperature of 18° to 20° C. In calculating the rate of corrosion, the length of exposure of the samples was taken to be equal to 145 hours. The averaged results of the determination of the rate of corrosion of steel in the absorbent are presented in the table below. For purposes of comparison, the results of a determination of the rate of corrosion of steel in the known absorbent are also given in the table (Examples 8 and 9), under the same conditions as those which have been described earlier.

It can be seen from the data presented in the table below that, as compared to the known absorbent, the absorbent of the composition of this invention possesses a lower corrosive activity while maintaining a high absorptive capacity with respect to hydrogen sulfide. When the absorbent of this invention is used, the rate of corrosion of steel is tens of times lower, which ensures the prolonged, uninterrupted work of installations for the removal of hydrogen sulfide from gases.

The absorbent of this invention may be used to remove hydrogen sulfide and mercaptans from natural gases, by-product gases, oil treatment facility gases, waste (exhaust) gases and other gases.

By using the absorbent of this invention, it becomes possible to obtain a significant positive technical and economic effect from the increase in the service life of equipment and the reduction in costs associated with performing the gas treatment process.

| Example No. | Composition of the absorbent, g/l | Rate of corrosion, mm/yr | Absorbent's capacity for sulfur, g/l |
|---|---|---|---|
| 1 | Iron: 4<br>DMPN: 25<br>sodium carbonate: 10<br>phosphate anion (as sodium phosphate): 10<br>water up to 1 l (pH 8.5) | 0.21 | 4.2 |
| 2 | Iron: 4<br>DMPN: 25<br>potassium carbonate: 20<br>phosphate(of potassium): 13<br>water up to 1 l (ph 8.5) | 0.10 | 4.8 |
| 3 | Iron: 1<br>DMPN: 5<br>potassium carbonate: 10<br>phosphate(of ammonium): 5<br>water up to 1 l (pH 9) | 0.30 | 1.5 |
| 4 | Iron: 12<br>DMPN: 60<br>potassium carbonate: 10<br>phosphate(of sodium): 32<br>water up to 1 l (pH 9.2) | 0.18 | 10.8 |
| 5 | Iron: 4<br>triethanolamine: 25<br>sodium hydroxide: 0.1<br>phosphate(of sodium): 15<br>water up to 1 l (pH 9) | 0.20 | 4.8 |
| 6 | Iron: 4<br>triethanolamine: 30<br>sodium carbonate: 25<br>sodium tripolyphosphate: 27.5<br>water up to 1 l (pH 9) | 0.25 | 4.8 |
| 7 | Iron: 4<br>dibutylamine: 15<br>potassium carbonate: 5<br>phosphate(of sodium): 9<br>water up to 1 l (pH 8.9) | 0.27 | 4.9 |
| 8* | Iron: 4<br>dibutylamine: 15<br>potassium carbonate: 18<br>water up to 1 l (pH 8.9) | 2.10 | 4.9 |
| 9* | Iron: 4<br>DMPN: 25<br>sodium carbonate: 25<br>water up to 1 l (pH 8.5) | 3.00 | 4.2 |

*Comparative example

What is claimed is:

1. A process for the removal of hydrogen sulfide from a hydrogen sulfide-containing gas comprising contacting said gas with an aqueous solution comprising chelated iron, an organic amine, an alkali metal hydroxide or carbonate, and an alkali metal or ammonium phosphate.

2. The process of claim 1 wherein said aqueous solution comprises, in terms of g/l:

| | |
|---|---|
| Chelated iron (as calculated for iron content) | 1–12 |
| Organic amine | 5–60 |
| Alkali metal hydroxide or carbonate | 1–60 |
| Alkali metal or ammonium phosphate (as calculated for phosphate-anion content) | 5–32 |
| Water. | |

3. The process of claim 1 wherein the chelated iron is a chelate of iron and ethylenediaminetetraacetic acid.

4. The process of claim 1 wherein the organic amine is selected from the group consisting of dialkylaminopropionitriles, alkanolamines and dialkylamines.

5. The process of claim 4 wherein the organic amine is dimethylaminopropionitrile, triethanolamine or dibutylamine.

6. The process of claim 5 wherein the organic amine is triethanolamine.

7. The process of claim 1 wherein the alkali metal hydroxide or carbonate is a sodium or potassium hydroxide, carbonate or bicarbonate.

8. The process of claim 1 wherein the alkali metal or ammonium phosphate is a sodium, potassium or ammonium phosphate or polyphosphate.

9. A composition for absorbing hydrogen sulfide from hydrogen sulfide-containing gases comprising an aqueous solution comprising chelated iron, an organic amine, an alkali metal hydroxide or carbonate, and an alkali metal or ammonium phosphate.

10. The composition of claim 9 wherein said aqueous solution comprises, in terms of g/l:

| | |
|---|---|
| Chelated iron (as calculated for iron content) | 1–12 |
| Organic amine | 5–60 |
| Alkali metal hydroxide or carbonate | 1–60 |
| Alkali metal or ammonium phosphate (as calculated for phosphate-anion content) | 5–32 |
| Water. | |

11. The composition of claim 9 wherein the chelated iron is a chelate of iron and ethylenediaminetetraacetic acid.

12. The composition of claim 9 wherein the organic amine is selected from the group consisting of dialkylaminopropionitriles, alkanolamines and dialkylamines.

13. The composition of claim 12 wherein the organic amine is dimethylaminopropionitrile, triethanolamine or dibutylamine.

14. The composition of claim 13 wherein the organic amine is triethanolamine.

15. The composition of claim 9 wherein the alkali metal hydroxide or carbonate is a sodium or potassium hydroxide, carbonate or bicarbonate.

16. The composition of claim 9 wherein the alkali metal or ammonium phosphate is a sodium, potassium or ammonium phosphate or polyphosphate.

* * * * *